United States Patent [19]

Isaka et al.

[11] Patent Number: 4,489,802
[45] Date of Patent: Dec. 25, 1984

[54] EXHAUST SYSTEM FOR MOTORCYCLES

[75] Inventors: Yoshiharu Isaka; Yukiharu Hosoi, both of Shizuoka, Japan

[73] Assignee: Yamaha Hatsudoki Kabushiki Kaisha, Japan

[21] Appl. No.: 443,535

[22] Filed: Nov. 22, 1982

[30] Foreign Application Priority Data

Nov. 30, 1981 [JP] Japan .................. 56-192260

[51] Int. Cl.³ .............................................. B62D 61/02
[52] U.S. Cl. .................................................. 180/219
[58] Field of Search ........................ 180/219, 225, 228

[56] References Cited

U.S. PATENT DOCUMENTS

| 703,769 | 7/1902 | De Long | 180/225 |
| 1,338,680 | 5/1920 | Dean | 180/225 |
| 4,094,375 | 6/1978 | Doncque | 180/219 |
| 4,226,296 | 10/1980 | Higaki | 180/219 |
| 4,280,582 | 7/1981 | Kouyama et al. | 180/225 |

Primary Examiner—Joseph F. Peters, Jr.
Assistant Examiner—Kenneth R. Rice
Attorney, Agent, or Firm—Ernest A. Beutler

[57] ABSTRACT

Two embodiments of motorcycle engine mounting and exhaust arrangements wherein the exhaust pipes of the rear bank of a V type engine are adapted to pass between the forward pivot point of the rear suspension arm and a recess formed in the crankcase transmission assembly of the engine. In one embodiment, the recess is defined by a single rearwardly extending engine mounting projection. In the other embodiment, the recess is defined between a pair of spaced rearwardly extending mounting projections. In the embodiment wherein only one mounting projection is employed, an arrangement is provided so as to insure balance of the loading on the frame from the single engine mount.

14 Claims, 5 Drawing Figures 4,489,802

1

EXHAUST SYSTEM FOR MOTORCYCLES

BACKGROUND OF THE INVENTION

This invention relates to an exhaust system for motorcycles and more particularly to an improved compact exhaust system and a cooperating engine mounting arrangement for motorcycles.

In many types of motorcycles, the engine is mounted with its crankshaft extending transversely to the longitudinal axis of the motorcycle. As a result, one or more cylinders of the engine may have rearwardly facing exhaust ports. When the engine has rearwardly facing exhaust ports, there arise certain difficulties in connection with the routing of the exhaust system from the exhaust ports to the atmosphere. These problems may be particularly acute when the engine is of the V type and has both forwardly and rearwardly facing cylinder banks.

It is the common practice to employ a suspension system for the rear wheel that includes a trailing arm having a forward pivotal axis to the frame. With such an arrangement, it is necessary for the exhaust system to clear the pivot axis of the rear suspension arm. This can be done by moving the pivot axis rearwardly and passing the exhaust pipe between the engine crankcase and the pivot axis. Such an arrangement, however, unnecessarily lengthens the wheel base of the motorcycle. Alternatively, it is possible to pass the exhaust pipe between the pivot axis and the rear wheel. When this is done, however, there must be sufficient clearance allowed for suspension movement and servicing becomes difficult. Furthermore, the wheel base may nevertheless be extended due to the necessity of providing clearance between the exhaust system, rear suspension and the rear wheel.

It is, therefore, a principal object of this invention to provide an improved exhaust system for a motorcycle.

It is another object of the invention to provide a motorcycle exhaust system that permits a compact arrangement, does not lengthen wheel base and yet facilitates servicing of the motorcycle.

It is a still further object of this invention to provide an improved exhaust system for a motorcycle having a V type engine.

In motorcycles, it is also desirable to suspend the engine from the frame in such a way that loadings on the frame can be equalized. The construction of the motorcycle and the clearance for the various components can be reduced if the engine mounting points are reduced. If only a single engine mounting point is used for one portion of the engine, it is desirable to insure that this mounting point is carried by the frame in such a way that uneven loadings on the frame are minimized.

It is, therefore, a further object of this invention to provide an improved and simplified mounting arrangement for a motorcycle engine.

SUMMARY OF THE INVENTION

A first feature of this invention is adapted to be embodied in a motorcycle of the type having an engine with at least one cylinder having an exhaust port opening in a longitudinal direction of the motorcycle and a crankcase assembly having a longitudinally extending mounting projection for supporting the engine and a recessed portion adjacent the projection. In accordance with this feature of the engine, an exhaust pipe extends from the exhaust port through the crankcase recessed portion.

Another feature of the invention is adapted to be embodied in a mounting arrangement for an engine of a motorcycle or the like comprising frame means having a pair of spaced mounting points and an engine having at least one mounting part. In accordance with this feature of the invention, first mounting means suspend the one engine mounting part from one of the frame mounting points and second mounting means suspend the one engine mounting part at least in part from the other frame mounting point.

DETAILED DESCRIPTION OF THE PREFERRED EMBODIMENTS

Figure 1:
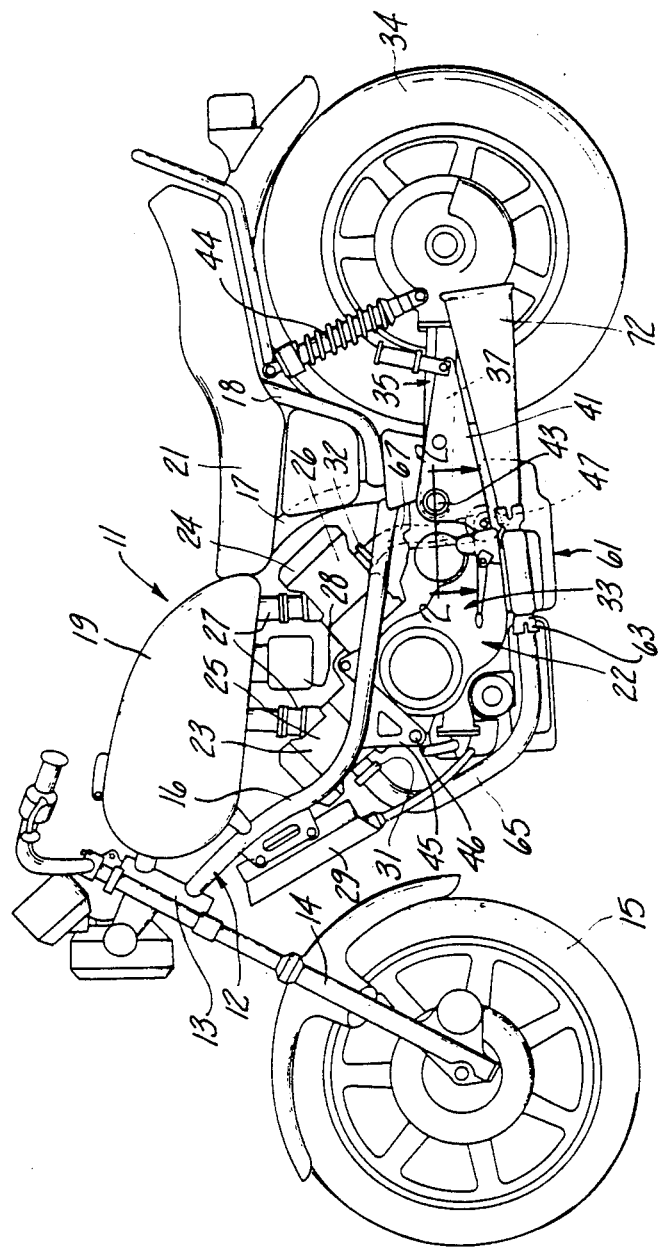
FIG. 1 is a side elevational view of a motorcycle constructed in accordance with a first embodiment of the invention.
Figure 2:
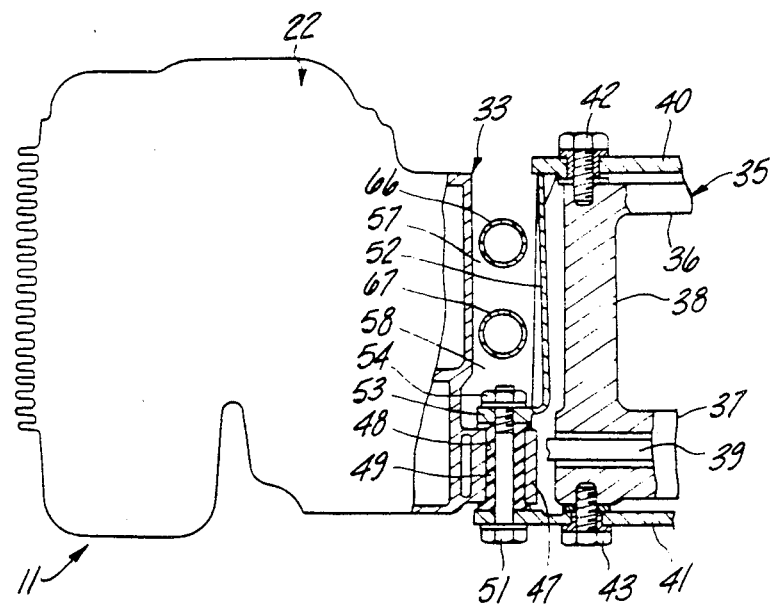
FIG. 2 is a view taken generally along the line 2—2 of FIG. 1 and shows a portion of the engine mounting arrangement and exhaust system in cross section.
Figure 3:
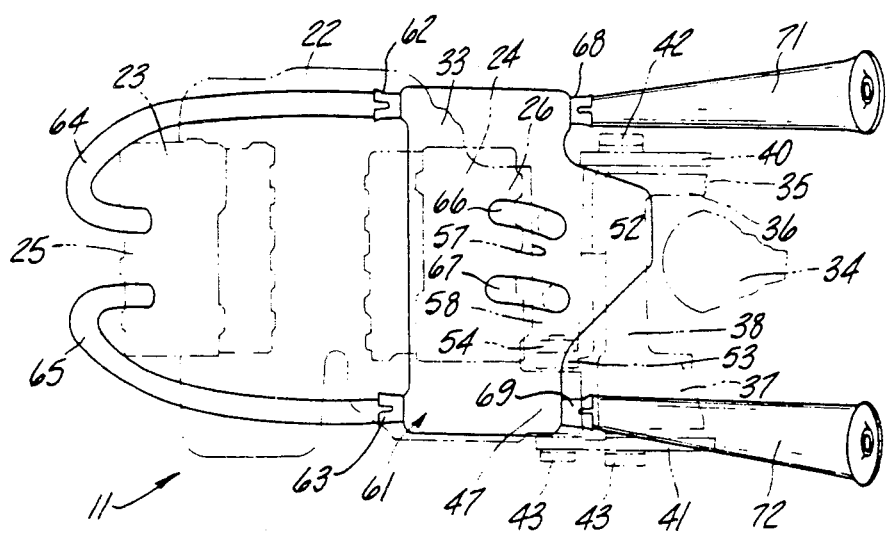
FIG. 3 is a top plan view showing the exhaust system in solid lines and the engine and rear suspension in phantom.

A motorcycle constructed in accordance with a first embodiment of the invention is shown in FIGS. 1 through 3 and is identified generally by the reference numeral 11. The motorcycle 11 includes a frame assembly, indicated generally by the reference numeral 12 and which includes a head pipe 13 that journals a front fork assembly 14 for steering movement in a known manner. A front wheel 15 is supported by the front fork 14 in a known manner.

The frame 12 is of the double cradle type and has pairs of down tubes 16 extending from the head pipe 13 on opposite sides of the longitudinal axis of the motorcycle 11. In addition, pairs of main pipes 17 are connected to the down pipes 16 at their forward ends. The down tubes 16 and main pipes 17 are interconnected at their rearward ends adjacent a pair of back stays 18. A saddle shaped fuel tank 19 is supported in a known manner about the main tubes 17 and a seat 21 is supported upon a pair of seat rails that extend between the main tubes 17 and the back stays 18 and which are not shown in the drawings.

An internal combustion engine, indicated generally by the reference numeral 22, is supported by the frame 12 in a manner to be described. The engine 22 is of the V four, four cycle type and is positioned with the axis of its crankshaft extending transversely to the longitudinal axis of the motorcycle. As a result, the engine is disposed with a first bank of cylinders 23 that extends generally forwardly in the frame 12 and a rear bank of cylinders 24 that extends generally rearwardly in the frame 12. It should be noted that the forward cylinder bank 23 is disposed beneath the fuel tank 19 whereas the rear cylinder bank 24 extends in the area where the fuel tank 19 and seat 21 are adjacent each other and, therefore, will be positioned between the legs of the rider.

The cylinder bank 23 includes a cylinder head 25 and the cylinder bank 24 includes a cylinder head 26. The cylinder heads 25 and 26 have their intake ports facing the valley of the V. An induction system comprised of intake pipes and charge forming devices in the form of carburetors 27 are provided for the cylinders of the respective cylinder heads 25, 26. The induction system extends upwardly from the V of the engine and into the cavity defined by the saddle shaped fuel tank 19. An intake device 28 extends downwardly from this cavity into the V and provides a system whereby air may be inducted into the intake system consisting of the intake pipes and carburetor 27 in a known manner.

The engine 22 is water cooled and therefore a radiator 29 is supported forwardly of the down pipes 16 in a known manner and delivers coolant to the engine 22 and receives heated coolant from the engine in a known manner.

The cylinder head 25 has a plurality of forwardly facing exhaust ports 31, there being one for each cylinder of this bank. In a like manner, the cylinder head 26 has a plurality of rearwardly facing exhaust ports 32, there again being one for each cylinder of this bank. An exhaust system, to be described, extends from the exhaust ports 31 and 32 for silencing and discharging the exhaust gases to the atmosphere.

The engine 22 also includes a combined crankcase transmission assembly, indicated generally by the reference numeral 33. The transmission crankcase assembly 33 is designed so as to afford a mounting arrangement for the engine 22 and also so as to provide an arrangement wherein the exhaust system associated with the rear bank of cylinders 24 may be arranged so as to permit a compact arrangement and at the same time facilitate servicing.

A rear wheel 34 is rotatably supported at the rear end of a trailing arm assembly, indicated generally by the reference numeral 35. The trailing arm assembly 35 includes a pair of arm portions 36 and 37 positioned at opposite sides of the wheel 34 and which are joined integrally by a bridging piece 38. The arm 37 is partially hollow and passes a drive shaft 39 that drives the rear wheel 34 in a known manner.

Brackets 40 and 41 are affixed to opposite sides of the frame 12 and specifically to the main tubes 17. The brackets 40 and 41 provide an arrangement for supporting both the rearward portion of the engine 22 and the rear wheel 34. For this latter purpose, pivot bolts 42 and 43 extend through the brackets 40 and 41, respectively, and into the bridging piece 38 of the trailing arm assembly 35. The pivot bolts 42 and 43 carry respective bushings so as to pivotally support the arm assembly 35 on the brackets 40 and 41 about a transversely extending pivot axis that is substantially parallel to the axis of rotation of the crankshaft of the engine 22. A pair of suspension elements 44 are disposed at each side of the frame 12 and are interposed between the arm 35 and frame 12 for cushioning the movement of the rear wheel 34 relative to the frame 12 in a known manner.

A pair of engine supporting brackets 45 are affixed, as by welding, to the down tubes 16 toward the forward portion of the engine 22. The forward portion of the engine 22 and specifically the crankcase transmission assembly 33 is supported on these brackets 45 in a known manner, as by means including bolts 46.

At the rear portion of the combined crankcase transmission assembly 33, a rearwardly extending mounting boss 47 is formed contiguous to the bracket 41 (FIG. 2). The boss 47 is formed with a transversely extending cylindrical bore 48 that receives an elastomeric bushing 49. A bolt 51 passed through the bushing 49 and through a suitable aperture in the bracket 41 so as to support the engine 22 from the side of the frame to which the bracket 41 is secured.

In order to distribute the loading of the engine 22 to both sides of the frame assembly 12, the plate 40 is formed with an offset arm portion 52 that extends across the rear suspension bridging portion 38 and toward the plate 41. Contiguous to the inner side of the mounting boss 47, this plate extension 52 has a forwardly extending part 53 through which the bolt 51 also passes. A nut 54 is affixed to the end of the bolt 51 and secures the arm extension 52 to the mounting boss 47 and, in turn, to the plate 41. Thus, even though the engine 22 has only one offset mounting boss 47 at its rearward face, the weight is borne substantially equally by both sides of the frame due to the cooperation with the extending arm portion 52.

The extension of the projection 47 from a rear face 55 of the crankcase transmission assembly 33 and its spacing from the arm portion 52 defines a transversely extending gap 58 between the rear portion of the engine 22 and the forward portion of the trailing arm interconnecting part 38. As will become apparent, the gap 58 is utilized so as to pass a portion of the exhaust system of the engine so as to permit a compact arrangement which will not interfere with servicing of the motorcycle nor will it require any lengthening of the wheel base of the motorcycle 11.

A transversely extending exhaust device, indicated generally by the reference numeral 61 extends beneath the rear portion of the transmission crankcase assembly 33 and substantially across the width of the motorcycle 11. The exhaust device 61 may constitute a muffler, expansion chamber or combination of these elements. The exhaust device 61 is provided with a pair of inlets 62 and 63 on opposite sides of the motorcycle 11. A pair of exhaust pipes 64 and 65 extend from the exhaust port joints 31 of the forward cylinder bank 23 downwardly and outwardly to enter into the exhaust device inlets 62 and 63, respectively. The exhaust device 61 is also formed with a pair of central inlets in a rearwardly extending portion of the device 61. A pair of exhaust pipes 66 and 67 extend from the rear bank exhaust port joints 32 downwardly and through the gap 58 to enter these inlets. Thus, the exhaust pipes 66 and 67 have a substantially straight run to the exhaust device 61 without necessitating lengthening of the wheel base to clear the rear suspension arm assembly 35 and also without interference with the rear suspension arm that would give problems in removal of the rear suspension arm without removal of the exhaust pipes 66 and 67.

The exhaust device 61 has a pair of outlets 68 and 69 into which combined tailpipe and muffler assemblies 71 and 72, respectively, extend. The tailpipe and muffler assemblies 71 and 72 extend rearwardly on opposite sides of the rear wheel 34 for discharging of the silenced exhaust gases to the atmosphere in a known manner.

Figure 4:
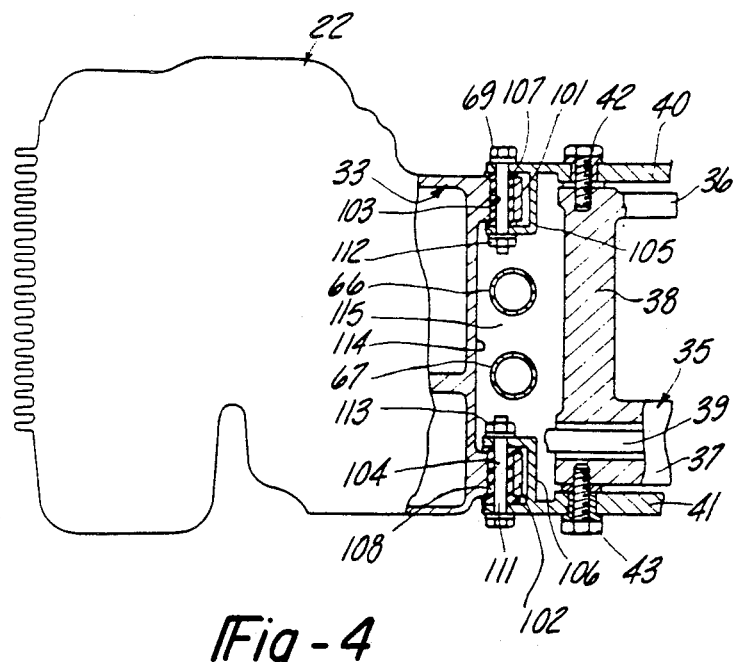
FIG. 4 is a view, in part similar to FIG. 2, and shows another embodiment of the invention.
Figure 5:
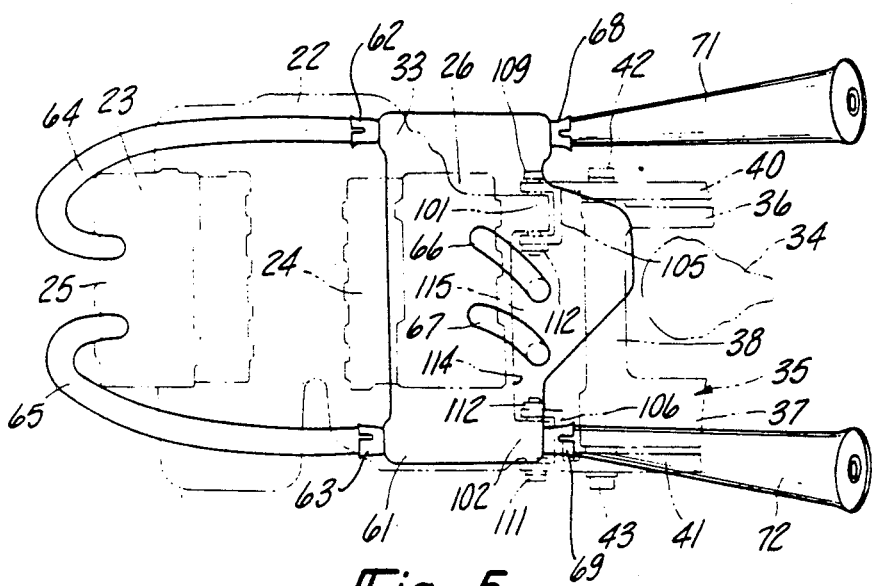
FIG. 5 is a top plan view, in part similar to FIG. 3, and shows the exhaust system of the embodiment of FIG. 4.

Referring now to the embodiment of FIGS. 4 and 5, this embodiment differs from the previously described embodiment only in the manner in which the rear portion of the engine is mounted. For that reason, only views corresponding to FIGS. 2 and 3 are used in connection with this embodiments and parts that are the same or substantially the same as the embodiment of FIGS. 1 through 3 have been identified by the same reference numeral and will not be described in detail.

In this embodiment, the rear portion of the engine crankcase transmission assembly 33 is provided with a pair of rearwardly extending mounting projections 101 and 102, each of which has a respective cylindrical bore 103, 104. The projections 101 and 102 are juxtaposed respectively to the forwardly extending portion of the plates 40 and 41. Each of the plates 40 and 41 is provided with a respective bifurcated portion 105, 106 at its forward end that embraces the respective mounting projection 101, 102.

Elastomeric sleeves 107 and 108 are received in the projection bores 103, 104, respectively. Bolts 109 and 111 extend through each of the bifurcated arms 105, 106 and cooperate with these projections and the elastomeric elements 107, 108 to support the engine at each side of the frame. Nuts 112 and 113 are received upon the bolts 109 and 111 to complete the support.

The area between the supporting projections 101, 102 is defined by a generally planar rear wall 114 of the transmission crankcase assembly 33 that in turn comprises a recess between the projections 101 and 102. This recess defines a gap 115 between the rear wall of the transmission crankcase assembly 33 and the interconnecting portion 38 of the rear arm assembly 35. The exhaust pipes 66 and 67 extend through this recess as in the previously described embodiment.

It should be readily apparent from the foregoing description that the arrangement of providing a recess in the rear wall of the crankcase transmission assembly 33 in each embodiment and the passing of the rear cylinder bank exhaust pipes through this recess permits a compact assembly without lengthening of the wheel base and without creating any interference between the suspension movement of the rear suspension arm 35. In addition, this arrangement permits the rear bank exhaust pipes to be located well internally of the overall configuration so that the heat generated by them will be well clear of the rider's legs. In addition, the arrangement is such that servicing of the motorcycle is facilitated. That is, it is not necessary to remove the rear exhaust pipes in order to remove the rear suspension arm assembly 35.

Although each embodiment of the invention has been described in conjunction with a V four type of engine, it should be readily apparent that the invention may be used with V type engines having other numbers of cylinders such as two, or more than four. In addition, certain aspects of the invention may be used in conjunction with engines other than those of the V type wherein the engine has its exhaust ports extending longitudinally of the motorcycle. Of course, the invention has particular utility in connection with V type engines since the spacial requirements of such engine are in some regards greater than engines of other cylinder types. Although two embodiments of the invention have been disclosed and other described, various other changes and modifications may be made without departing from the spirit and scope of the invention, as defined by the appended claims.

We claim:

1. In a motorcycle of the type having frame means, an engine with at least one cylinder having an exhaust port opening in the rearward direction of the motorcycle and a crankcase assembly having a longitudinally extending mounting projection for supporting said engine from said frame means and a recessed portion adjacent said mounting projection and defining an opening with said frame means, the improvement comprising an exhaust pipe extending from said exhaust port through said crankcase recessed portion and said opening.

2. In a motorcycle as set forth in claim 1 wherein the engine has a plurality of cylinders with at least one cylinder having its exhaust port as described therein.

3. In a motorcycle as set forth in claim 2 wherein the engine is of the V type with a forwardly facing bank and a rearwardly facing bank and the one cylinder comprises one cylinder of the rearwardly facing bank.

4. In a motorcycle as set forth in claim 3 wherein the one exhaust pipe from the rear cylinder extends to an exhaust device inlet and further including an exhaust pipe extending from a cylinder of the other bank to a separate exhaust gas inlet of the exhaust device.

5. In a motorcycle as set forth in claim 4 wherein the mounting projection of the engine comprises a pair of spaced apart mounting projections with the recessed portion being defined therebetween.

6. In a motorcycle as set forth in claim 5 wherein the engine has a plurality of cylinders in the rearwardly facing bank each of which has an exhaust port and an exhaust pipe extending through the recess.

7. In a motorcycle as set forth in claim 1 wherein the crankcase assembly comprises a combined crankcase and transmission for driving the rear wheel of the motorcycle and the longitudinally extending mounting portion is formed at one side thereof.

8. In a motorcycle as set forth in claim 7 wherein there are a pair of spaced longitudinally extending mounting portions at each side of the crankcase transmission assembly.

9. In a motorcycle of the type having an engine of the V type with at least one cylinder of one bank comprising a rear cylinder having an exhaust port opening in the longitudinal direction of the motorcycle and a crankcase assembly having a longitudinally extending mounting projection for supporting said engine and a recessed portion adjacent said mounting projection, the improvement comprising said mounting projection of said engine being juxtaposed to one side of the frame of the motorcycle and further including means for providing a connection between the mounting projection and the other side of the frame and defining in part said recessed portion, an exhaust pipe extending from said exhaust port through said crankcase recessed portion to an exhaust device inlet and further including an exhaust pipe extending from a cylinder of the other bank to a separate exhaust gas inlet of the exhaust device.

10. In a motorcycle as set forth in claim 9 wherein the engine has a plurality of cylinders in the rearwardly facing bank each of which has an exhaust port and an exhaust pipe extending through the recess.

11. In a mounting arrangement for an engine of a motorcycle or the like comprising frame means having a pair of laterally spaced mounting part and an engine having at least one mounting point, the improvement comprising first mounting means for supporting said engine mounting part from at least one of said frame mounting points and defining an opening, said engine having at least one cylinder having a rearwardly facing exhaust port and an exhaust pipe extending from said exhaust port through said opening for discharge of exhaust gases to the atmosphere, said frame mounting points providing means for pivotally supporting a trailing arm arrangement for supporting a rear wheel of the motorcycle for movement relative to the remainder of the frame means.

12. In a mounting arrangement for an engine of a motorcycle or the like comprising frame means having a pair of laterally spaced mounting points and an engine having at least one mounting part, the improvement comprising first mounting means for supporting said one engine mounting part from one of said mounting points and second mounting means for suspending said one engine mounting part at least in part from the other of said frame mounting points, said laterally spaced frame mounting points further include means for defining a front pivotal support for a trailing arm suspension of a rear wheel of the motorcycle.

13. In a mounting arrangement as set forth in claim 12 wherein the means for suspending the one engine mounting part at least in part from the other of the frame mounting portions comprises an extending portion of the other frame mounting point that extends transversely across the motorcycle frame and terminates adjacent the engine mounting part.

14. In a mounting arrangement as set forth in claim 13 wherein the extending portion of the frame mounting point is spaced from the engine and defines a gap adapted to pass an exhaust pipe.

* * * * *

UNITED STATES PATENT AND TRADEMARK OFFICE
CERTIFICATE OF CORRECTION

PATENT NO. : 4,489,802

DATED : December 25, 1984

INVENTOR(S) : Yoshiharu Isaka et al

It is certified that error appears in the above-identified patent and that said Letters Patent is hereby corrected as shown below:

Column 6, line 56, claim 11,

"part " should be --points--.

Column 6, line 57, claim 11,
"point" should be --part--.

Signed and Sealed this

Thirtieth Day of July 1985

[SEAL]

Attest:

DONALD J. QUIGG

*Attesting Officer*     *Acting Commissioner of Patents and Trademarks*